US011423052B2

(12) United States Patent
Pandit et al.

(10) Patent No.: US 11,423,052 B2
(45) Date of Patent: Aug. 23, 2022

(54) USER INFORMATION ASSOCIATION WITH CONSENT-BASED CLASS RULES

(71) Applicant: INTERNATIONAL BUSINESS MACHINES CORPORATION, Armonk, NY (US)

(72) Inventors: Sushain Pandit, Austin, TX (US); Martin Oberhofer, Bondorf (DE); Steven Lockwood, Derby (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 686 days.

(21) Appl. No.: 15/842,377

(22) Filed: Dec. 14, 2017

(65) Prior Publication Data

US 2019/0188312 A1    Jun. 20, 2019

(51) Int. Cl.
*G06F 7/00* (2006.01)
*G06F 16/28* (2019.01)
*G06N 3/08* (2006.01)
*G06F 21/62* (2013.01)

(52) U.S. Cl.
CPC ........ *G06F 16/285* (2019.01); *G06F 21/6245* (2013.01); *G06N 3/08* (2013.01)

(58) Field of Classification Search
CPC ....... G06F 16/58; G06F 16/355; G06F 16/338
USPC ................ 707/738, 749, 720, 721, 758, 803
See application file for complete search history.

(56) References Cited

U.S. PATENT DOCUMENTS

| 6,892,193 | B2* | 5/2005 | Bolle ............... G06V 20/40 707/E17.022 |
| 6,993,535 | B2* | 1/2006 | Bolle ............... G06F 16/637 707/E17.103 |
| 7,243,097 | B1 | 7/2007 | Agrawal et al. |
| 7,533,113 | B1 | 5/2009 | Haddad |
| 8,219,417 | B2 | 7/2012 | Dalton |
| 8,417,648 | B2* | 4/2013 | Hido .................. G06K 9/623 706/20 |
| 9,105,083 | B2* | 8/2015 | Rhoads ............ G06Q 30/0269 |
| 9,443,101 | B2 | 9/2016 | Jacquin |
| 9,621,357 | B2 | 4/2017 | Wiiliams et al. |
| 9,792,160 | B2* | 10/2017 | Shear ................ G06F 16/245 |

(Continued)

FOREIGN PATENT DOCUMENTS

| CN | 107203610 | 9/2017 |
| EP | 1226524 | 7/2002 |

OTHER PUBLICATIONS

Reuse Library Interoperability; Browne et al. ACM 1997 (Year: 1997).*

(Continued)

*Primary Examiner* — Daniel A Kuddus
(74) *Attorney, Agent, or Firm* — Steven L. Nichols; Fabian VanCott (57) ABSTRACT

User information categorization using consent-based class rules is described. Consent from a user is received regarding at least one functional area where user information is shareable is received. Based on the consent, at least one data class that is permitted to be shared is determined. A user information designation is associated with the at least one data class and class rules are applied to user information associated with the user information designation based on the association between the user information designation and the at least one data class.

20 Claims, 9 Drawing Sheets

(56) References Cited

U.S. PATENT DOCUMENTS

| | | | | |
|---|---|---|---|---|
| 9,904,572 | B2 * | 2/2018 | Busaba | G06F 9/5044 |
| 9,904,579 | B2 * | 2/2018 | Shear | G06F 9/50 |
| 2003/0004966 | A1 * | 1/2003 | Bolle | G06F 16/685 |
| | | | | 707/E17.103 |
| 2003/0033347 | A1 * | 2/2003 | Bolle | G06K 9/00711 |
| | | | | 718/107 |
| 2003/0069824 | A1 * | 4/2003 | Menninger | G06Q 10/06 |
| | | | | 705/37 |
| 2011/0161076 | A1 * | 6/2011 | Davis | H04M 1/72448 |
| | | | | 704/E15.001 |
| 2012/0280908 | A1 * | 11/2012 | Rhoads | H04M 1/0264 |
| | | | | 345/156 |
| 2014/0280952 | A1 * | 9/2014 | Shear | H04L 47/70 |
| | | | | 709/226 |
| 2014/0323142 | A1 * | 10/2014 | Rodriguez | G06V 10/751 |
| | | | | 718/104 |
| 2014/0337733 | A1 * | 11/2014 | Rodriguez | G06V 10/751 |
| | | | | 715/718 |

OTHER PUBLICATIONS

Peppet, S.R.; "Regulating the internet of things: first steps toward managing discrimination, privacy, security and consent"; 2014; Forthcoming Texas Law Review; 78 pages.

Pearson, S. et al.; "Taking the creative commons beyond copyright: developing smart notices as user centric consent management systems for the cloud"; International Journal of (continued) Cloud Computing; 2015; Inderscience Enterprises, Ltd.; 2 pages.

* cited by examiner

|  | | Marketing | Sales | Prom. | 3rd Party |
|---|---|---|---|---|---|
| 520 — Consent | | Y | Y | N | Y |
|  | | | | | |
| 522-1 — Name | | N | N | N | Y |
| 522-2 — Age | | Y | Y | N | N |
| 522-3 — Address | | N | N | Y | Y |

USER INFORMATION ASSOCIATION WITH CONSENT-BASED CLASS RULES

BACKGROUND

The present invention relates to the sharing of information, specifically the sharing of information via designation categorization. In today's society, large amounts of information can be disseminated online. Systems through which this information is shared are wide in variety. For example, social networks, commercial corporation networks, institutional networks, and others all allow information to be disseminated, in some cases across different online networks. In some cases, user information is shared within these online networks.

SUMMARY

According to an embodiment of the present invention, a computer-implemented method for associating user information using consent-based class rules is described. According to the method, user consent is received allowing user information to be shared in at least one functional area. Based on this consent, at least one data class that is permitted to be shared is determined. A user information designation is associated with the at least one data class and class rules are applied to the associated user information based on the association between the user information designation and the at least one data class.

The present specification also describes a system. A database of the system includes user information for a number of users. The user information is grouped by user information designations. An interface of the system receives an indication, per functional area, of user consent to share user information. The system also includes a management controller. The management controller includes a class database that includes a number of data classes and class rules indicating which data classes are permitted to be shared based on consent given. The management controller also includes an associator to associate user information designations with at least one data class in the management controller.

The present specification also describes a computer program product. The computer program product includes a computer readable storage medium having program instructions embodied therewith. The program instructions are executable by a processor to cause the processor to during a training phase form a mapping between user information designations and data classes by 1) forming training vectors for training information designations which are associated to predetermined data classes and 2) calculating association variables based on the training vectors and the predetermined data classes. The program instructions are also executable by the processor to cause the processor to 1) determine, based on consent received, data classes that are permitted to be shared; 2) extract a user information designation stored in a database; and 3) determine a designation profile for the user information designation. The program instructions are also executable by the processor to 1) convert the consent into a numerical representation; 2) convert the user information designation into a numerical representation; 3) convert the designation profile into a numerical representation; and 4) form a feature vector from the numerical representations of the consent, user information designation, and designation profile. The program instructions are also executable by the processor to apply, to user information associated with the user information designation, class rules based on the association between the user information designation and the associated data class.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, online networks are expanding in their ability to provide services and information to their users. This information can be disseminated globally in any variety of forms. For example, social networks allow users to share information with people on the other side of the world. News outlets use online networks to distribute the news of the day as well as to allow the public to post, and comment on different stories, thus resulting in a more interconnected citizenry. In some examples, organizations, vie these online networks have access to large amounts of user information. For example, social networks, may include profile information as well as remarks made by those users which remarks can carry metadata or other information related to its users. As yet another example, businesses during online electronic transactions, acquire user information for a purchaser of a product.

While such online networks clearly have a role in modern society and provide great benefit to people everywhere, some aspects of these online networks can be problematic. For example, these online networks can be compromised. When this occurs, the information stored thereon, including the data of users of that network, may be exposed. Accordingly, the data used by these organizations, in particular the user information of its clients, should be maintained hidden and secure. Most organizations, irrespective of their size, deal with access and security concerns when it comes to their master data, or user information for their clients.

Accordingly, the present specification describes a system wherein a user is granted increased control over their user information and has the ability to give consent in how their data is used across business functions. Specifically, according to a specific example, a user may give explicit consent for their information to be used in certain functional areas (e.g., marketing, sales, and by third parties). Class rules may be used to determine which classes of user information are sharable based on the consent. However, user information stored in an organization's database may not be the same as the classes that are associated with the class rules. For example, the class rules may indicate that a "customer name" class of information is shareable, however, the user information in an organization's database may have a designation of "customer ID" and not a customer name. Accordingly, even if there are class rules that describe the proper use of the term "customer name," it may not be straightforward to assert whether or how those rules apply to, for instance, a "customer ID" in the database of the organization. Accordingly, the present specification describes associating the user information on the organization's database with the data classes associated with the class rules. Through this association, the class rules that apply to a particular data class can be propagated to the user information for an organization. In other words, the present specification describes a system and method to discover relationships between an organization's user information database with data classes such that an appropriate set of class rules can be applied to the organization's user information.

In summary, such a system and method 1) ensures security of user information; 2) ensures compliance with consent management aspects of data security regulations; 3) lowers the cost of achieving compliance by detecting the proper consent management enforcement rules using cognitive capabilities; and 4) reduces risk that an organization will not properly manage sensitive information by avoiding non-compliant use of user information. However, it is contemplated that the devices disclosed herein may address other matters and deficiencies in a number of technical areas.

As used in the present specification and in the appended claims, the term "user information" refers to information as it is stored by an entity, for example on an organization's database. The term "user information designation" refers to a label for the user information. For example, "party name" may be a designation and the user information may be a user's actual name.

Further, as used in the present specification and in the appended claims, the term "data class" refers to types of information that may be shared as it is stored on a management system.

Further, as used in the present specification and in the appended claims, the term "consent" refers to a user's general consent to share user information per functional area. For example, a user may allow their user information be shared in a marketing functional area. Note that this consent is to their user information in general, and is not specific to particular pieces of user information such as name, age, etc.

Further, as used in the present specification and in the appended claims, the term "functional area" refers to particular operations, such as business classifications, that may use user information. Examples of such functional areas include, but are not limited to, marketing, sales, promotions, and $3^{rd}$ party use.

Further, as used in the present specification and in the appended claims, the term "class rules" refers to rules that determine particular data classes that may be shared within a given functional area, assuming consent is given for that functional area. For example, for the functional area of marketing, class rules may indicate that a customer age may be shared. By comparison, for the functional area of $3^{rd}$ party use, class rules may indicate that a customer name and address may be used, but not a customer age.

Further, as used in the present specification and in the appended claims, the term "feature vector" refers to an n-dimensional vector of numerical representation of pieces of data. To create a vector representation of textual descriptions, a vector space model such as term frequency-inverse document frequency (TF-IDF) can be used where the vector is made up of numerical values representing a prevalence of certain words in an overall corpus. Other examples of vector space models may also be implemented.

Yet further, as used in the present specification and in the appended claims, the term "a number of" or similar language is meant to be understood broadly as any positive number including 1 to infinity.

Figure 1:
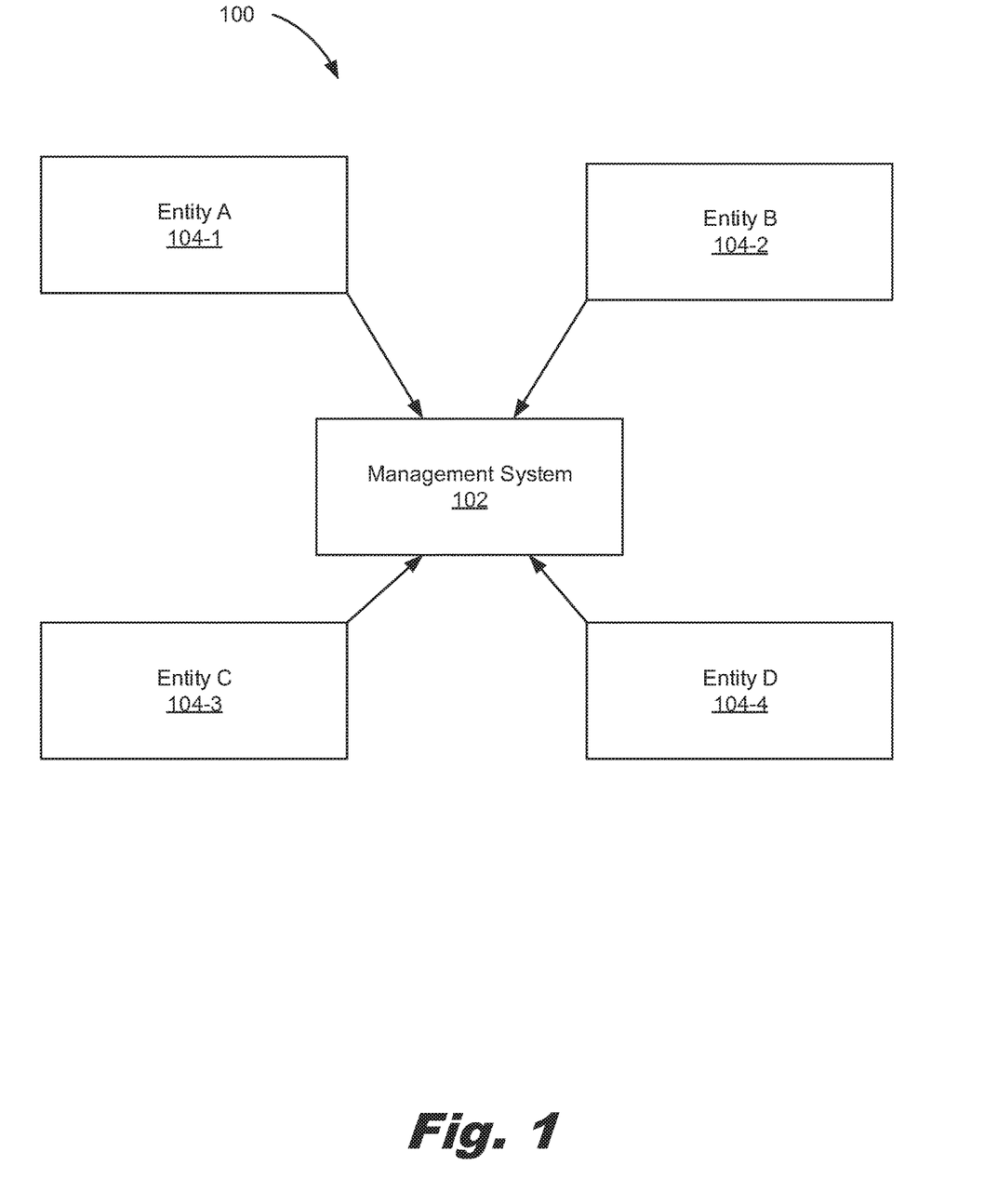
FIG. 1 depicts an environment for associating user information consent-based class rules, according to an example of the principles described herein.

Turning now to the figures, FIG. 1 depicts an environment (100) for associating user information with consent-based class rules, according to an example of the principles described herein. As described above, different organizations have databases of information that they rely on to carry out organizational objectives such as business endeavors, social causes, public services, and/or social networking services. In some examples, the information stored on the servers of these organizations include user information that a user may desire to keep hidden and/or secure. Accordingly, such organizations may subscribe to, or use a management system (102) that manages the security of this information. As depicted in FIG. 1, the different organizations may be referred to as entities (104-1, 104-2, 104-3, 104-4). An entity (104) may subscribe to, or own, a management system (102) that provides data security protections. As described above, the entities (104) may refer to any number of organizations or other entities such as consumer service organizations, product providers, service providers, social network providers, and collaborative correspondence organizations. While specific reference is made to particular types of entities (104), any type of organization may subscribe to, or otherwise use, the management system (102) described herein.

The management system (102) as described herein refers to the system that assists in providing information security management. In some cases, the management system (102) may be disposed at an entity (104) site. In other examples, the management system (102) may be remote, and may be managed by a management system (102) owner. An example of a management system (102) is provided below in connection with FIG. 3.

Figure 2:
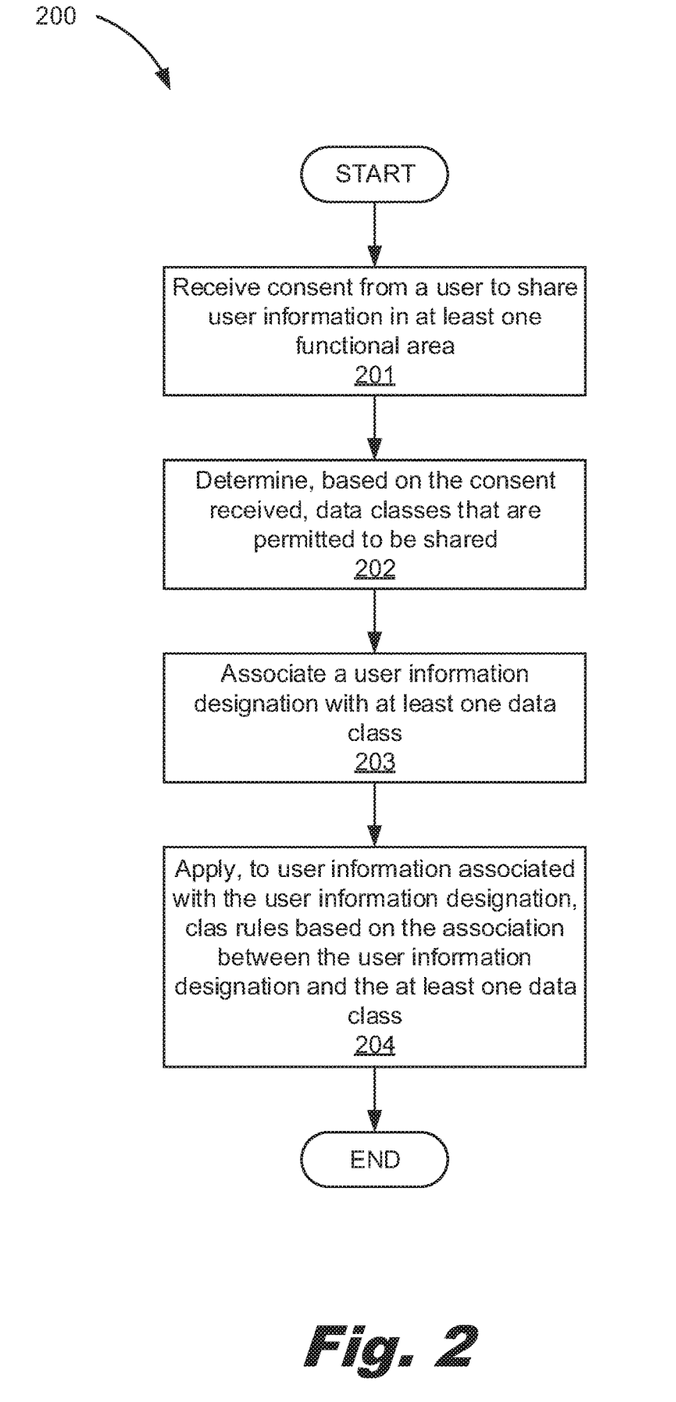
FIG. 2 depicts a flowchart of a method for associating user information with consent-based class rules, according to an example of principles described herein.

FIG. 2 depicts a flowchart of a method (200) for associating user information with consent-based class rules, according to an example of principles described herein. According to the method (200) consent is received (block 201) from a user, which consent indicates for which functional areas a user's user information can be shared. For example, an entity (FIG. 1, 104) may engage in a number of different functional areas. Examples of functional areas of an entity (FIG. 1, 104) include a marketing functional area, a sales functional area, a promotions functional area, and a $3^{rd}$ party functional area. Each of these different functional areas may rely on user information stored on an entity's (FIG. 1, 104) servers. To increase user information security, a user may indicate which functional areas the user authorizes their user information to be shared in. Specifically, the consent is received (block 201) per functional area. For example, a user may indicate that they consent to their user information used in a marketing functional area, a sales functional area, and a third party functional area, but may not consent to their information being used in a promotional functional area.

In some examples, the consent that is received (block 201) is user specific. For example as indicated above, a first user may indicate that they consent to their user information used in a marketing functional area, a sales functional area, and a third party functional area, but may not consent to their information being used in a promotional functional area. A second user may indicate that they consent to their user information being used in just the sales functional area, and not in the marketing functional area, the third party functional area, or for use in the promotional functional area.

With the consent given, the management system (FIG. 1, 102) determines (block 202) based on the consent received, data classes that are permitted to be shared. As described above, a data class refers to a type of user information that may be shared. Examples of data classes include a customer name, age, and address. While specific description is provided of certain data classes, other data classes may exist as well. Determining (block 202) which data classes may be shared can be performed in any number of ways.

In one example, the management system (FIG. 1, 102) includes a database that maps consents received with data classes that are shareable once said consent is given. For example, the database may indicate that when a marketing functional area is marked as being consented to, a customer age data class is shareable, but that customer name and address data classes are not shareable. In another example, the database may indicate that when a promotions functional area is marked as being consented to, customer address data class may be shareable, but customer name and age data classes are not shareable. Accordingly, determining (block 202) which lasses are permitted to be shared may include consulting a mapping between consents and data classes that are permitted to be shared. In some examples, this mapping between consents and data classes that are permitted to be shared is the same for multiple users. That is, consents given may be individual to a user, but the data classes that may be shared when such functional areas are consented to, may be user-ambiguous. Such mappings may be determined by a management system (FIG. 1, 102) owner. Accordingly, such mappings between consents and data classes that are permitted to be shared may be entity-ambiguous. In another examples, the mappings may be determined by a management system (FIG. 1, 102) owner or the entity (FIG. 1, 104) itself and may be entity specific. For example, an entity (FIG. 1, 104) may determine what it deems to be appropriate data classes that may be shared per functional area.

The management system (FIG. 1, 102) can then associate (block 203) a user information designation with at least one data class. That is, before the class rules that are associated with certain data classes can be applied to an entity's (FIG. 1, 104) user information, an association is generated between a corresponding user information designation and the data classes. As an entity's (FIG. 1, 104) user information may be different from the data classes, such association (block 203) accounts for variation in designation terminology. For example, the user information designation associated with a "customer name" data class maybe designated as a "party name," a "person name," a "party identifier," or any other such designation. Accordingly, by associating (block 203) the user information designation with a data class, the class rules associated with the data class can be applied to the user information in the entity (FIG. 1, 104) database.

Accordingly, once such association (block 203) is completed, class rules associated with the data classes can be applied (block 204) to the user information associated with the user data designation, based on the aforementioned association between the user information designation and the data class. For example, if the user information designation "party name" is associated (block 203) with the data class "customer name," then the class rules that are associated with a "customer name" data class are applied to the user information associated with the designation "party name."

As used in the present specification and in the appended claims, a sharing rule designates which data classes are permitted to be shared, given a consent to a corresponding functional area. For example, a sharing rule for the data class "customer name" may indicate that a customer name can be shared when consent for sharing of user information in a marketing functional area is received and/or when consent for sharing of user information in a sales functional area is received. The class rules for the data class "customer name" may also indicate that a customer name may not be shared when consent for sharing user information in a promotions functional area is not received. As with the mapping between consents and data classes permitted to be shared, such class rules may be user-ambiguous and/or entity ambiguous meaning that such rules are similarly applied across multiple users and/or entities (FIG. 1, 104).

Accordingly, the method (200) as described herein facilitates the application of consent-based class rules, regardless of the user information designation found within an entities (FIG. 1, 104) databases. Thus, an entity (FIG. 1, 104) can provide greater security to its clients or other users.

Figure 3:
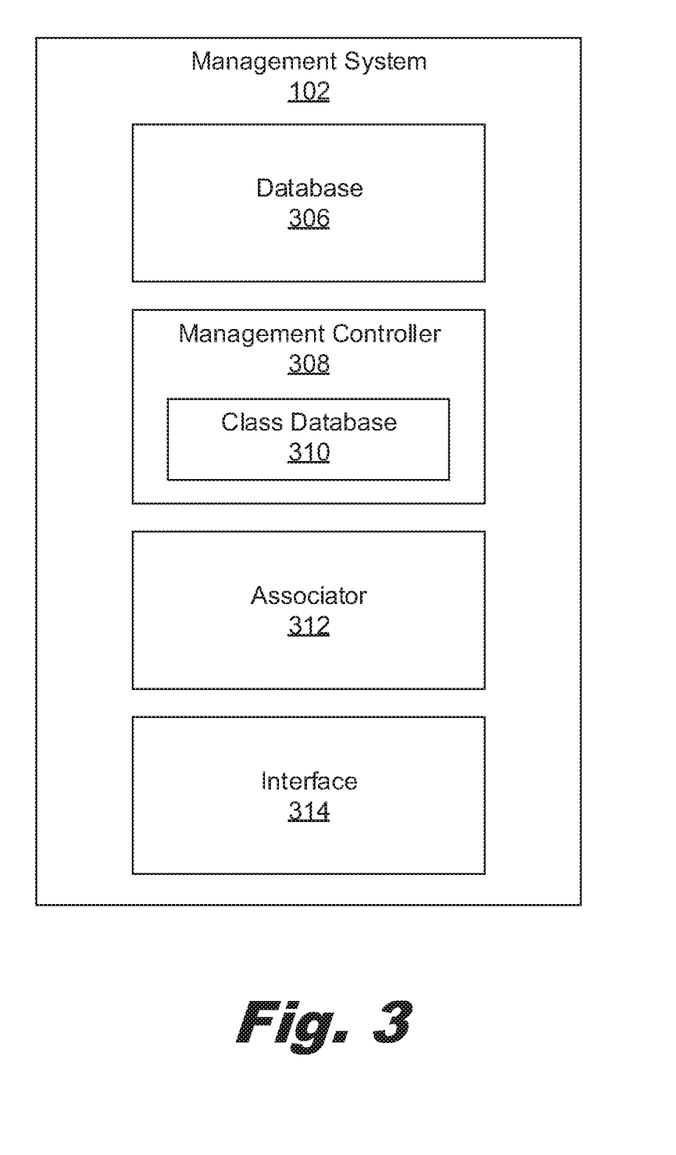
FIG. 3 depicts a system for associating user information with consent-based class rules, according to an example of the principles described herein.

FIG. 3 depicts a system (102) for associating user information with consent-based class rules, according to an example of the principles described herein. To achieve its desired functionality, the management system (102) includes various components. Each component may include a combination of hardware and program instructions to perform a designated function. The components may be hardware. For example, the components may be implemented in the form of electronic circuitry (e.g., hardware). Each of the components may include a processor to execute the designated function of the engine. Each of the components may include its own processor, but one processor may be used by all the components. For example, each of the components may include a processor and memory. Alternatively, one processor may execute the designated function of each of the components.

The management system (102) includes a database (306). The database (306) includes user information for a number of users. The user information is grouped based on designations. For example, values representing a customer identification may be grouped under the designation "customer ID." The database (306) may include any number of user information designations and may rely on the user information to carry out objectives associated with the entity (FIG. 1, 104). Other examples of user information that may be stored in the database (306) and defined by designations includes demographic information, such as address and age. Other types of user information includes educational information and professional information among others. While reference is made to particular types of user information, many different types of user information may be stored on the database. Moreover the user information designations indicated in the database (306) may be unique to a particular entity (FIG. 1, 104). That is, each entity (FIG. 1, 104) may have its own unique way to designate pieces of user information. Thus, the management system (102) can classify the entity-specific designations to entity-ambiguous classes.

As described above, in modern society, the security of such information is of increasing relevance. Accordingly, the management system (102) provides a user with more control over how their user information is disseminated electronically. Accordingly, the management system (314) includes an interface (314). Via the interface, the management system (102) may receive input regarding particular consents that a user gives regarding the dissemination of their user information via the entity's (FIG. 1, 104) operations. Such an interface (314) may include a computer display along with input/output controllers, a mobile device with input/output controllers, etc. For example, via the interface (314), the management system (314) may receive indication that a particular user consents to the entity (FIG. 1, 104) using their user information in just a promotional functional area. This may be done via graphical-user interface (GUI), where a user may select among various options. The input to this GUI is communicated to the management system (102) for further processing.

From this consent, the system (FIG. 1, 102) determines which information within the entity's (FIG. 1, 104) database (306) can be shared based on the consents received. Specifically, a management controller (308) of the management system (102) includes a class database (310). The class database (310) includes a number of data classes as well as class rules associated with the data classes. The class rules indicate which data classes are permitted to be shared when a consent is given for a particular functional area. As described above, a data class refers to a designation of user information and class rules for a data class indicate how types of user information within that data class can be shared, under various consents given by a user. Specific reference is made in the present specification to demographic types of information, i.e., customer name, customer age, and customer address; however various types of user information, in addition to demographic information, may be defined within the class database (310).

In some examples, the class database (310) also includes a mapping between the data classes that are permitted to be shared and the functional areas. That is, this mapping may indicate which data classes may be shared within a particular functional area when consent for information sharing within that particular functional area is selected. Such a mapping may also indicate which data classes may not be shared within a particular functional area when consent for information sharing within that particular functional area is selected. An example of such a mapping is described below in connection with FIG. 5. In some examples, at least one data class is associated with multiple functional areas. For example, a "customer age" data class and its associated class rules may be mapped to a marketing functional area, a sales functional area, a promotions functional area, and a $3^{rd}$ party functional area.

The system also includes an associator (312) that associates user information designations in an entity's (FIG. 1, 104) database (306) to the data classes in the class database (310). That is, the management system (102) may receive as input user information designations, and can associate that input to data classes within the class database (310). This may occur in any number of ways. For example, the associator (312) may derive feature vectors for each user information designation. As described above, a feature vector refers to a numerical representation of information. Accordingly, the associator (312) may convert the user information designator string of "party name" into a numerical representation. An operation is then carried out which converts the feature vector into a value. This value is mapped to a particular data class. In other words, the associator (312) may convert an input user information designation into a numerical representation and then perform an operation to generate an output numerical representation. This output numerical representation is associated with a particular data class.

In some examples, the associator (312) is a neural network associator (312) that can, based on a training sample of data, form mappings between user information designations and data classes. That is, in operation the associator (312) converts an input numerical representation, associated with user input designations into an output numerical representation associated with a particular data class. A learning associator, such as a neural network associator (312) determines variables by which the input numerical representation is converted into the output numerical representation. This mapping may be determined by first determining training vectors for training designations which are associated to predetermined data classes and their synonyms. For example, training samples of different user information designations which are predetermined to map to certain classes may be input. From these predetermined mappings, the association variables that are applied to a feature vector can be determined based on the training vector and predetermined data classes. That is, during a training phase, an input and an output is predetermined, and the neural network associator (312) determines the variables to convert the predetermined input into the predetermined output. With these association variables determined, the associator (312) can, in a categorization phase, apply the association variables to the input user information designation to determine a data class to which that user information designation pertains.

Figure 4:
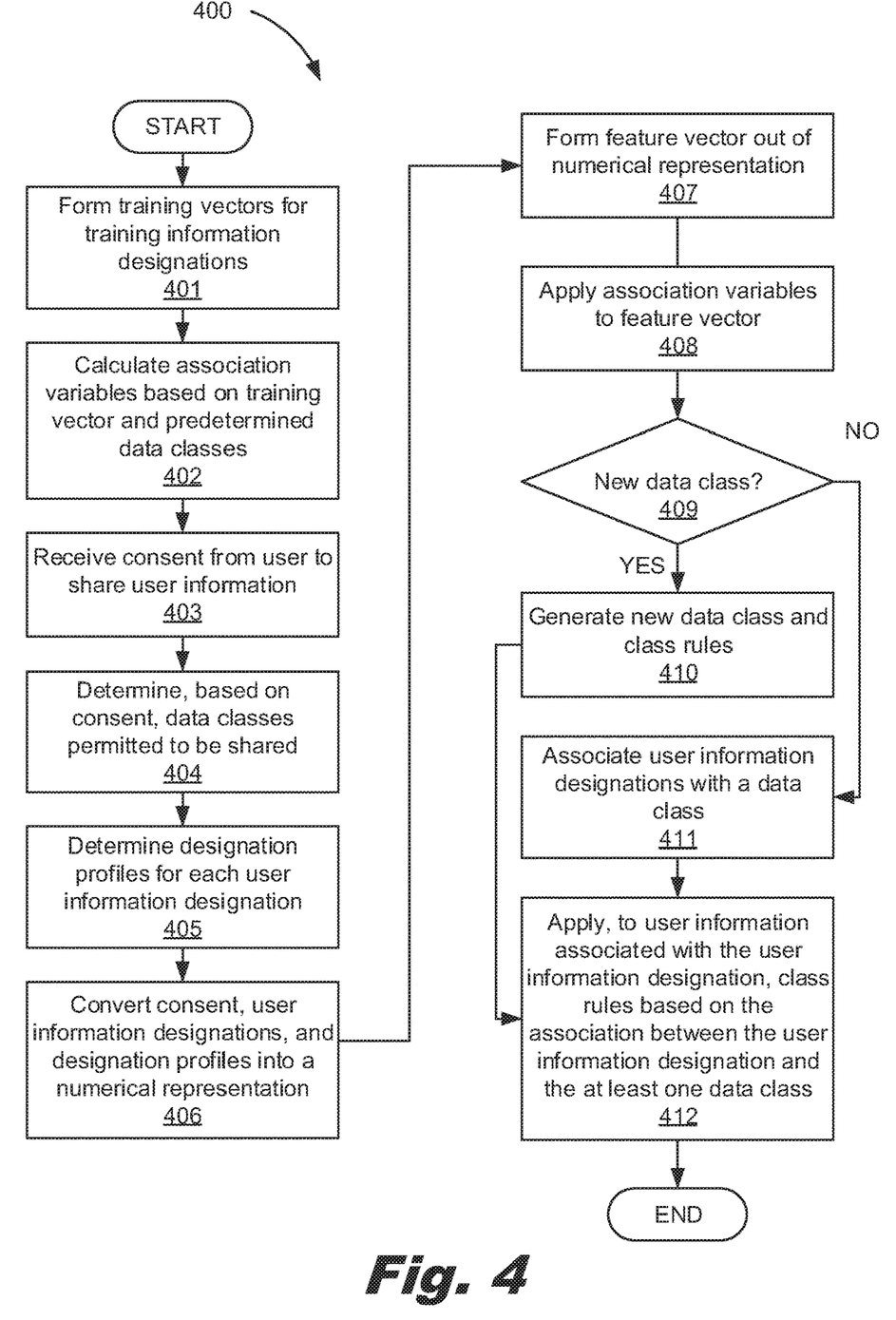
FIG. 4 depicts a flowchart of a method for associating user information with consent-based class rules, according to an example of the principles described herein.

FIG. 4 depicts a flowchart of a method (400) for associating user information with consent-based class rules, according to an example of the principles described herein. In some examples, the management system (FIG. 1, 102) and more specifically, the associator (FIG. 3, 312) may be a machine-learning associator (FIG. 3, 312) such as a neural network associator (FIG. 3, 312). Such a machine-learning associator (FIG. 3, 312) is a system that can be trained to identify patterns in generating an output. In this example, the machine-learning associator (FIG. 3, 312) may learn the data classes that particular user information designations are associated with, based on a training. Accordingly, during a training phase, the management system (FIG. 1, 102) may form (block 401) training vectors from training user information designations. Such training vectors may correspond to predetermined user information designations that correspond to predetermined data classes. For example, it may be identified that the user information designation "party name" maps to the data class "customer name." Accordingly, a training vector could be formed (block 401) that maps to this particular data class. Each training vector also includes additional information that aids in the determination of association variables. Examples of such additional information includes designation profile information for and the consents received for each functional area. Doing so ensures the feature vector is rich enough so that the management system (FIG. 1, 102) can classify it properly.

The designation profile information refers to any data that characterizes user information grouped within a particular designation. For example, such designation profile information may include a data type, such as a string or a numeric value. It may include a length of entries. For example user information relating to the designation of "user name" may include, on average 35 characters. Another example of designation profile information includes the number of nulls, referring to the number of entries associated with that particular user information designation that do not have values. For example, for a first user, there may be no listed username. The designation profile information may be helpful in categorizing user information designations. For example, in some cases the user information designation may be a term frequency/inverse document frequency (TF-IDF) form which refers to a particular manner in which a piece of information is converted into a numeric representation, i.e., feature vector. However, the addition of profile information, appended to that feature vector may provide additional information by which user information designations may be categorized.

With the input and output predetermined, input user information designation and output data class, association variables can be calculated (block 402). The association variables represent numeric scalers that are calculated and used by the associator (FIG. 3, 306) when, during classification and not training, converting an input numeric representation corresponding to a user information designation into an output numeric representation corresponding to a class to which the user information is categorized. That is, the management system (FIG. 1, 102) is learning the values of the association variables in the training phase to be used later during the classification/association. That is, these variables are used at a later point in time to classify user information designations during a categorization period.

During training, in addition to performing a mapping between user information designations and data classes, the system (FIG. 1, 102) can perform mappings between user information designations and synonyms for data classes. For example, the 'customer name' data class may have synonyms such as party name, person name, and party identifier. For each training set user information designation, association variables can be calculated (block 402) with regards to each synonym. The association variables for each instance, i.e., each mapping of user information designation to a class or synonym thereof can then be combined. As will be described below, these association variables are later used to associate user information designations with data classes in an association phase.

A specific example of forming a training vector is now provided. In this example, the neural network associator (FIG. 3, 312) takes a composite feature vector which includes the training user information designation that includes values representing a customer name, which may be stored in a TF-IDF form, designation profile information, represented as a numeric vector, and the consents provided also represented as a numeric representation. In this example, the designation profile information may characterize the user information designation 1) as being a string type—corresponding to a binary value of 1, 2) as having a length of 50, and 3) of having a null quantity of 0. Moreover, the consents given may indicate "yes" for marking functional area use, "yes" for sales functional area use, "no" for promotional functional area use, and "yes" for third-party functional area use. In this example, "yes" is associated with the binary value of 1 and "no" is associated with the binary value of 0. Moreover, the TF-IDF representation of the user information designation may be 0.03, 0.05, 0.04. Accordingly, the feature vector may be {0.03, 0.05, 0.04, 1, 50, 0, 1, 1, 0, 1}. This feature vector, a predetermined input, can then be associated with predetermined output classes, "customer name" as well as its synonyms "party name," "person name," and "party identifier," to calculate (block 402) association variables.

The management system (FIG. 1, 102) may also receive (block 403) consent from a user to share that user's information and may determine (block 404) based on the user consent, data classes that are permitted to be shared. This may be performed as described above in regards to FIG. 2.

In some examples, designation profile information for user information designations can be determined (block 405). The consent provided, user information designations, and designation profiles can then be converted (block 406) into a numerical representation, similar to as described above during a training phase and a composite feature vector formed (block 407) from the numerical representations.

The association variables are then applied (block 408) to the feature vector, and an output is calculated. That is, the associator (FIG. 3, 312) multiplies the numeric representation of the user information designation, consents received, and designation profiles by the association variables and outputs a resulting value that can be associated with a particular data class. Such an operation includes determining (block 409) whether the output of the associator (FIG. 3, 312) indicates a new data class. That is, as described above, outputs of the associator (FIG. 3, 312) may map to particular data classes. However, in some cases the output of the associator (FIG. 3, 312) may not result in an output that maps to a particular data class. If this is not the case, (block 409, determination NO), the user information designation is associated (block 411) with the class associated with the output of the associator (FIG. 3, 312) and class rules applied (block 412) to the associated user information associated with that designation.

In the case that the output of the associator (FIG. 3, 312) indicates a new data class (block 409, determination YES), a new data class and associated class rules are generated (block 410). Specifically in the example of a new data class being identified, the management system (FIG. 1, 102) may prompt a user to define a new data class and generate class rules associated with that data class. In other words the new data class and associated class rules may be based on user input. With the new data class and class rules generated, the newly created class rules are applied (block 412) with the user information associated with the corresponding designation within the newly created data class.

Figure 5:
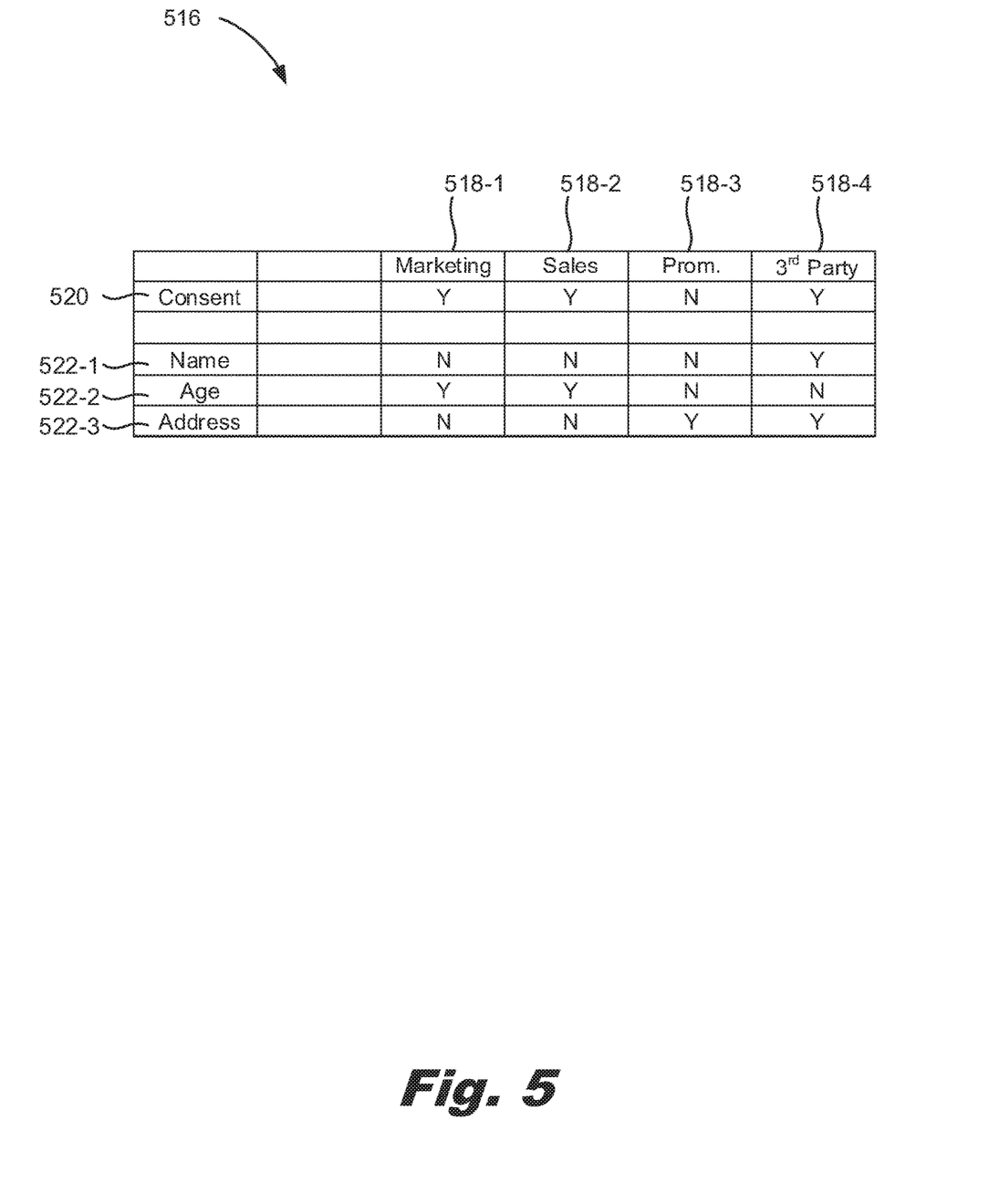
FIG. 5 depicts a mapping between consent and class rules for data classes, according to an example of principles described herein.

FIG. 5 depicts a mapping (516) between consent (520) and class rules for data classes (522), according to an example of principles described herein. As described above, the class database (FIG. 3, 310) may include various pieces of information that are used to ensure security of user information. For example, the mapping (516) may indicate consent (520) that is received for various functional areas (518). In this specific example, a user has consented to the use of their user information in a marketing functional area (518-1), a sales functional area (518-2), and a third party functional area (518-4), but has not consented to the use of their user information in a promotional functional area (518-3).

The mapping (516) also maps functional area (518) consent with data classes (522) that are permitted to be shared when such consent is given. For example, the class rules may indicate that when a marketing functional area (518-1) is approved for dissemination of user information, just "age" classes (522-2) can be shared, while information associated with a "name" data class (522-1), and an "address" data class (522-3) cannot be shared, even when authorization is given for user information to be used in a marketing functional area (518-1). As described above, such data classes (522) may have different sharing rights per different functional area (518). According to the present specification, just those data classes (522) that have a "Y" in the first row as well as "Y"s in the associated columns can be shared via the present system. Using this mapping (516) as well as user information designation-to-data class associations, the system (FIG. 1, 102) can ensure that a user's information is shared just based on their explicitly given consent.

Figure 6:
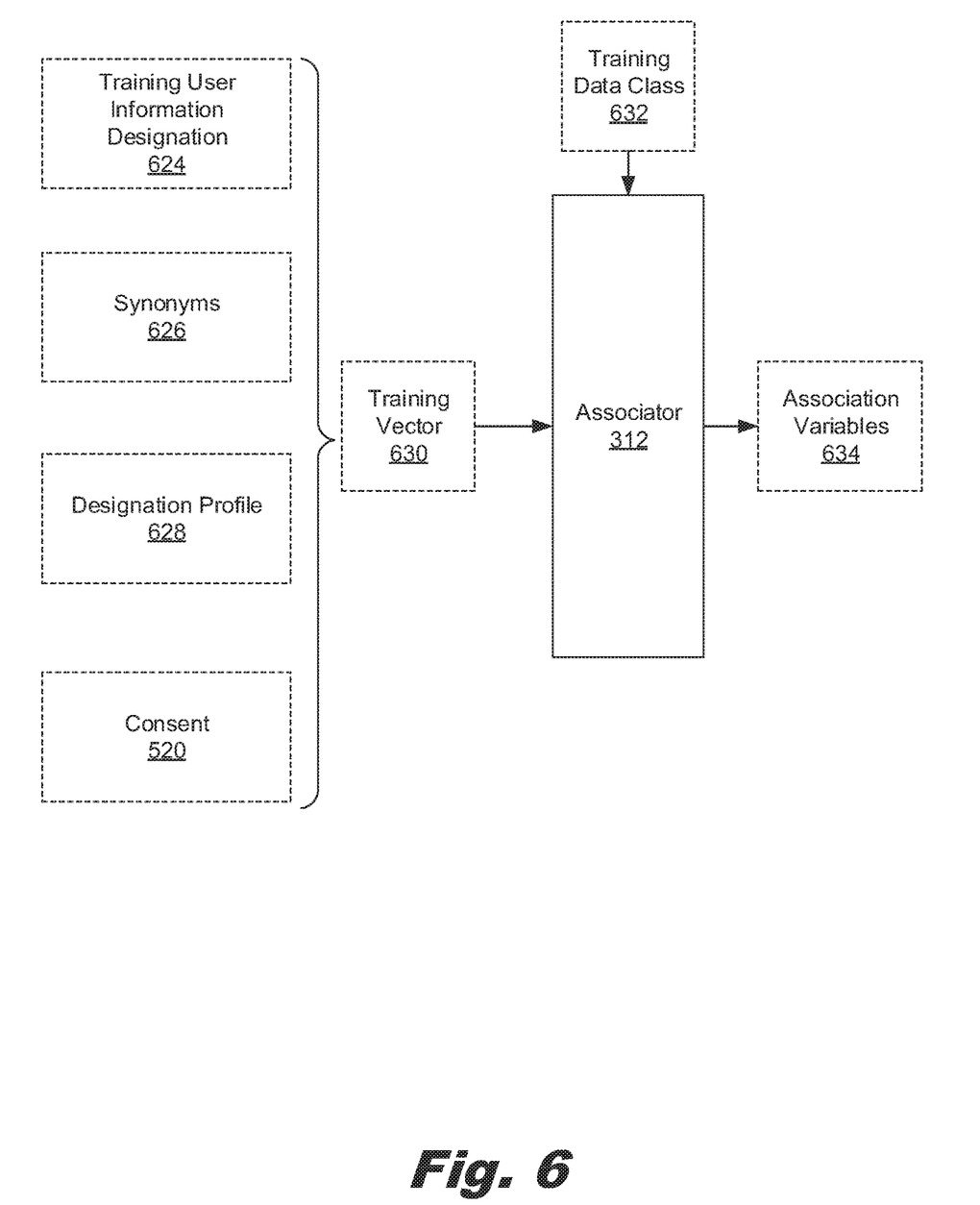
FIG. 6 depicts a system for associating user information with consent-based class rules in a training phase, according to an example of the principles described herein.

FIG. 6 depicts a system for categorizing user information using consent-based class rules in a training phase, according to an example of the principles described herein. As described above, in some examples, the associator (312) is a machine-learning neural network associator (312), meaning that it learns patterns of behavior given a training sample. Accordingly, during a training phase, a training user information designations (624), associated designation profile information (628), as well as consent (520) received per functional area (FIG. 5, 518) are combined into a training vector (630). Different synonyms (626) for the training data class (632) are also formed into the training vector (630). Synonyms (626) are helpful as they provide additional robustness in determining the association variables (634). This training vector (630) is then passed to the associator (312) along with predetermined training data classes (632). In this example, the training user information designations (624) are predetermined to be associated with predetermined training data classes (632). Accordingly, with this information, the associator (312) can determine association variables (634) that will be applied to feature vectors in an association phase to associate different pieces of user information to particular data classes. In other words, the output of the associator (312) may be weights that are used to convert the training vector (630) into an output that corresponds with the training data class (632). These association variables (634) are then used in a categorizing phase depicted in FIG. 7 to determine a data class associated with a particular user information designation.

Figure 7:
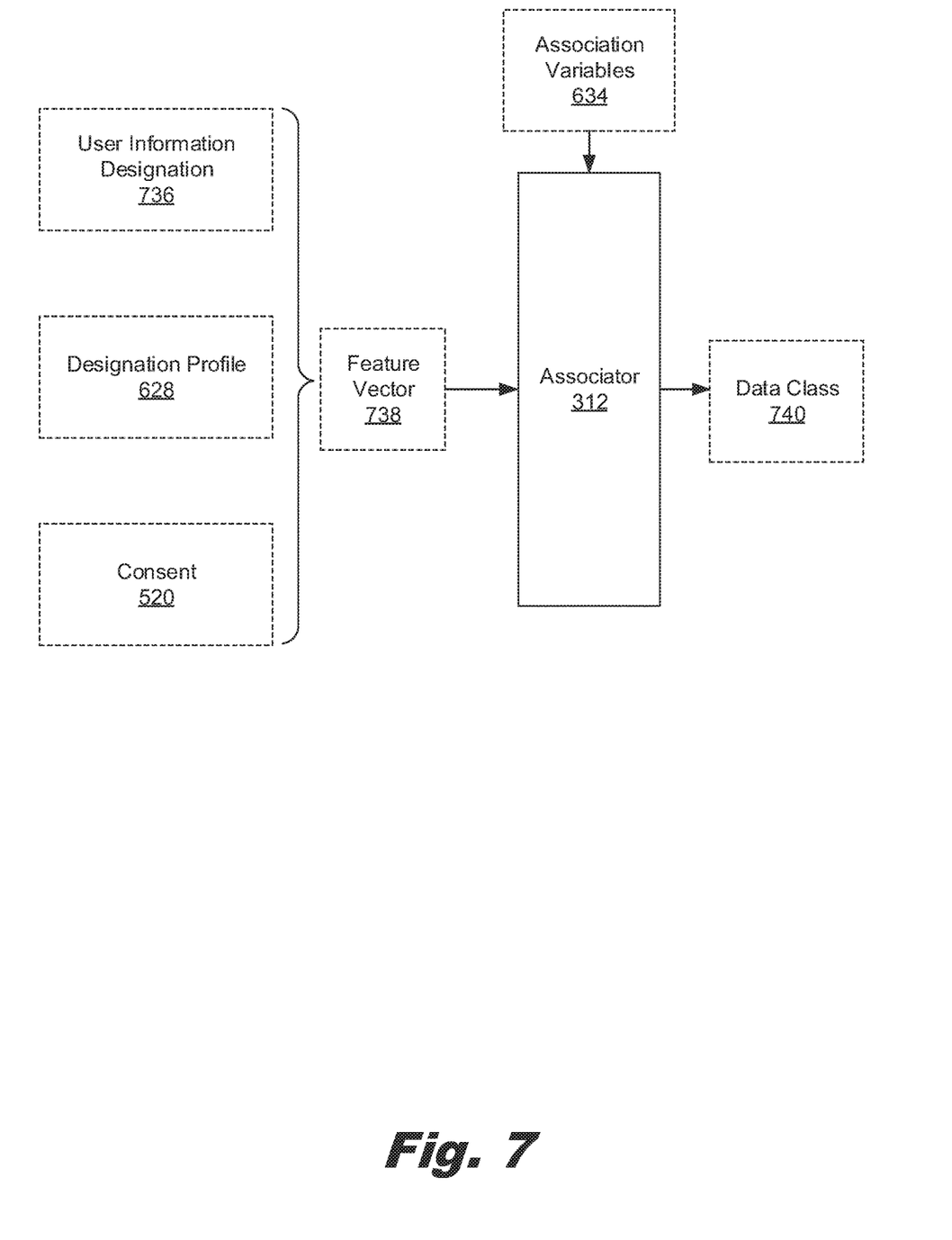
FIG. 7 depicts a system for associating user information with consent-based class rules in a classifying phase, according to an example of the principles described herein.

FIG. 7 depicts a system for categorizing user information using consent-based class rules in a classifying phase, according to an example of the principles described herein. Similar to as described above in FIG. 6, certain pieces of information are sent to an associator (312), specifically, user information designations (736), which is distinct from the training user information designation (FIG. 6, 624 depicted in FIG. 6), the associated designation profile (628), and consents (520). As noted, in the association phase, the user information designation (736) is not predetermined, meaning it is not associated with a predetermined data class (FIG. 6, 632). Accordingly, the feature vector (738) is distinct from the training vector (FIG. 6, 630) and corresponds to the user information designation (736). In this example, the feature vector (738) and the association variables (634) are input into the associator (312) to generate an output. If the output is within a threshold distance relative to an output that is mapped to a particular data class (740), the associated class rules for that data class (740) are applied to the user information indicated by the respective designation. If the output is not within a threshold distance relative to an output that is mapped to a particular data class, a new data class is created along with class rules that correspond thereto. In the case that a new data class is generated, this new data class and user input designation mapping is included in the training samples such that more accurate categorizations can be developed therefrom. With the appropriate data class and class rules identified, either via previously defined data classes or a newly defined data class, the class rules can be applied to the associated user information.

Figure 8:
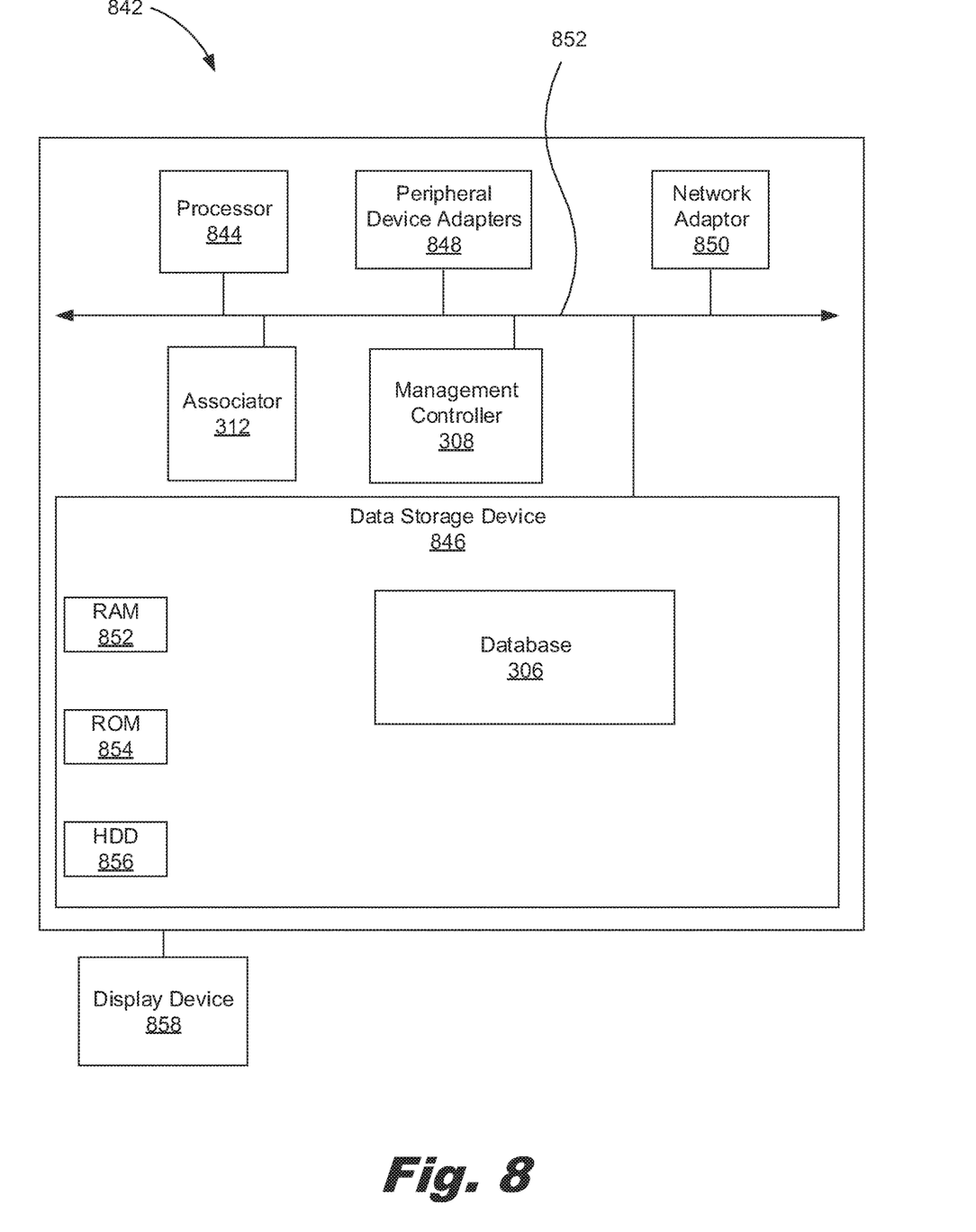
FIG. 8 is a diagram of a computing system for associating user information with consent-based class rules, according to an example of the principles described herein.

FIG. 8 is a diagram of a computing system (842) for associating user information with consent-based class rules, according to an example of the principles described herein. The computing device (842) may be implemented in an electronic device. Examples of electronic devices include servers, desktop computers, laptop computers, personal digital assistants (PDAs), mobile devices, smartphones, gaming systems, and tablets, among other electronic devices.

The computing device (842) may be utilized in any data processing scenario including, stand-alone hardware, mobile applications, through a computing network, or combinations thereof. Further, the computing device (842) may be used in a computing network. In one example, the methods provided by the computing device (842) are provided as a service over a network by, for example, a third party.

To achieve its desired functionality, the computing device (842) includes various hardware components. Among these hardware components may be a number of processors (844), a number of data storage devices (846), a number of peripheral device adapters (848), and a number of network adapters (850). These hardware components may be interconnected through the use of a number of busses and/or network connections. In one example, the processor (844), data storage device (846), peripheral device adapters (8488, and a network adapter (850), as well as the associator (312) and management controller (308) may be communicatively coupled via a bus (842).

The processor (844) may include the hardware architecture to retrieve executable code from the data storage device (846) and execute the executable code. The executable code may, when executed by the processor (844), cause the processor (844) to implement at least the functionality of categorizing user information using consent-based class rules. The functionality of the computing device (842) is in accordance to the methods of the present specification described herein. In the course of executing code, the processor (844) may receive input from and provide output to a number of the remaining hardware units.

The data storage device (846) may store data such as executable program code that is executed by the processor (844) or other processing device. As will be discussed, the data storage device (846) may specifically store computer code representing a number of applications that the processor (844) executes to implement at least the functionality described herein.

The data storage device (846) may include various types of memory modules, including volatile and nonvolatile memory. For example, the data storage device (846) of the present example includes Random Access Memory (RAM) (852), Read Only Memory (ROM) (854), and Hard Disk Drive (HDD) memory (856). Many other types of memory may also be utilized, and the present specification contemplates the use of many varying type(s) of memory in the data storage device (846) as may suit a particular application of the principles described herein. In certain examples, different types of memory in the data storage device (846) may be used for different data storage needs. For example, in certain examples the processor (844) may boot from Read Only Memory (ROM) (854), maintain nonvolatile storage in the Hard Disk Drive (HDD) memory (856), and execute program code stored in Random Access Memory (RAM) (852).

The data storage device (846) may include a computer readable medium, a computer readable storage medium, or a non-transitory computer readable medium, among others. For example, the data storage device (846) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device. In some examples, the data storage device (846) includes the database (306) that includes the aforementioned information.

The hardware adapters (848, 850) in the computing device (842) enable the processor (844) to interface with various other hardware elements, external and internal to the computing device (842). For example, the peripheral device adapters (848) may provide an interface to input/output devices, such as, for example, display device (858), a mouse, or a keyboard. The peripheral device adapters (848) may also provide access to other external devices such as an external storage device, a number of network devices such as, for example, servers, switches, and routers, client devices, other types of computing devices, and combinations thereof.

The display device (858) may be provided to allow a user of the computing device (842) to interact with and implement the functionality of the computing device (842) and may be a component of the interface (FIG. 3, 314) through which information is exchanged. The peripheral device adapters (848) may also create an interface between the processor (844) and the display device (856), a printer, or other media output devices. The network adapter (850) may provide an interface to other computing devices within, for example, a network, thereby enabling the transmission of data between the computing device (842) and other devices located within the network.

The computing device (842) may, when executed by the processor (844), display the number of graphical user interfaces (GUIs) on the display device (858) associated with the executable program code representing the number of applications stored on the data storage device (846). Examples of display devices (858) include a computer screen, a laptop screen, a mobile device screen, a personal digital assistant (PDA) screen, and a tablet screen, among other display devices (858).

Figure 9:
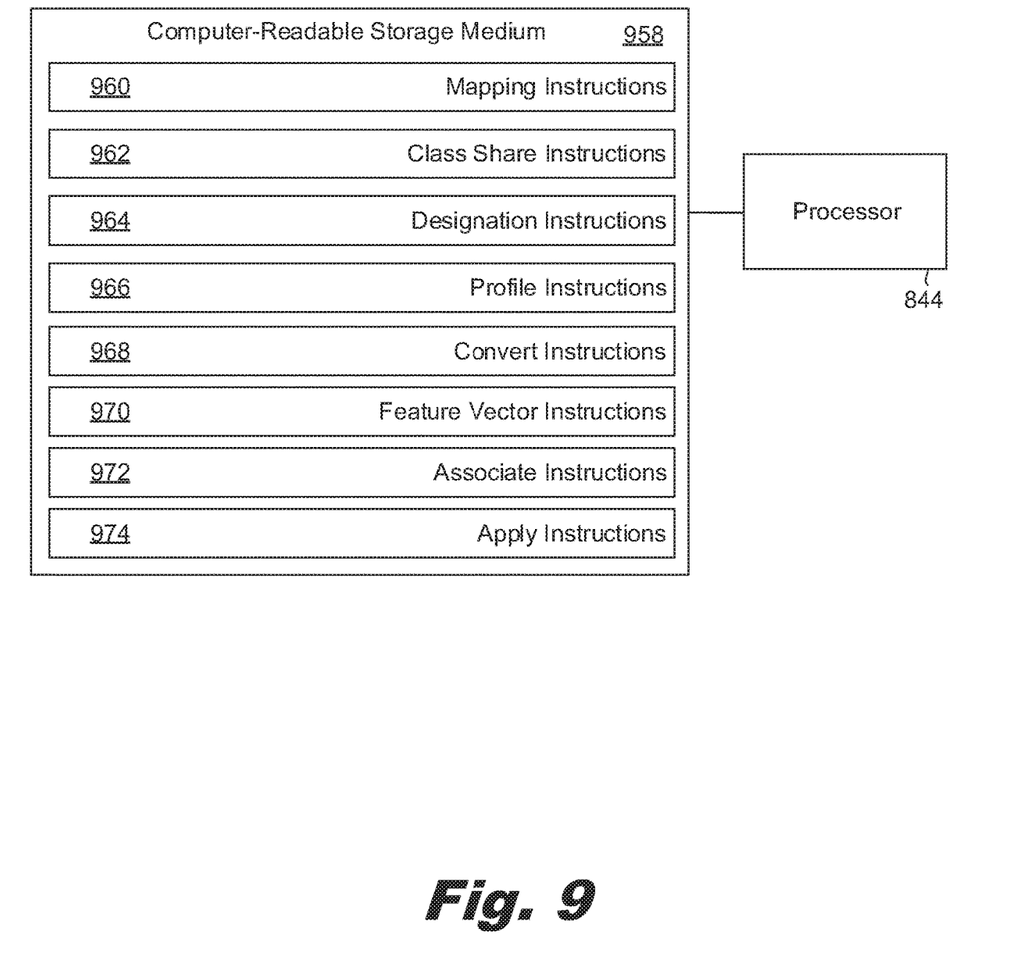
FIG. 9 depicts a computer readable storage medium for associating user information with consent-based class rules, according to an example of principles described herein.

FIG. 9 depicts a computer readable storage medium (958) for categorizing user information using consent-based class rules, according to an example of principles described herein. To achieve its desired functionality, a computing system includes various hardware components. Specifically, a computing system includes a processor (844) and a computer-readable storage medium (958). The computer-readable storage medium (958) is communicatively coupled to the processor (844). The computer-readable storage medium (958) includes a number of instructions (960, 962, 964, 966, 968, 970, 972, 974) for performing a designated function. The computer-readable storage medium (958) causes the processor (844) to execute the designated function of the instructions (960, 962, 964, 966, 968, 970, 972, 974).

Referring to FIG. 9, mapping instructions (960), when executed by the processor (844), cause the processor (844) to form a mapping between user information designations and data classes by forming a training vector and calculating association variables based on the training vectors and the predetermined data classes. Class share instructions (962), when executed by the processor (844), may cause the processor (844) to determine, based on consent received, data classes that are permitted to be shared. Designation instructions (964), when executed by the processor (844), may cause the processor (844) to determine user information designations stored in a database. Profile instructions (966), when executed by the processor (844), may cause the processor (844) to determine a designation profile for the user information designation. Convert instructions (968), when executed by the processor (844), may cause the processor (844) to convert the consent, user information designation, and designation profile into a numerical representation. Feature vector instructions (970), when executed by the processor (844), may cause the processor (844) to form a feature vector from the numerical representations. Associate instructions (972), when executed by the processor (844), may cause the processor (844) to associate the user data designation with a data class based on the feature vector and association variables. Apply instructions (974), when executed by the processor (844), may cause the processor (844) to apply class rules associated with the data classes to user information categorized into those data classes.

In summary, such a system and method 1) ensures security of user information; 2) ensures compliance with consent management aspects of data security regulations; 3) lowers the cost of achieving compliance by detecting the proper consent management enforcement rules using cognitive capabilities; and 4) reduces risk that an organization will not properly manage sensitive information by avoiding non-compliant use of user information. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving consent, from a user, which consent indicates for which functional areas user information for the user is permitted to be shared;
determining, based on the consent, at least one data class that is permitted to be shared;
associating a user information designation in an entity database with the at least one data class in a class database;
applying, to user information associated with the user information designation, class rules based on the association between the user information designation and the at least one data class, and
forming a feature vector from numerical representations of the consent and the user information designation.

2. The computer-implemented method of claim 1, wherein consent is received per functional area.

3. The computer-implemented method of claim 1, wherein:
the consent received is user specific; and
the class rules are applied to user information for multiple users.

4. The computer-implemented method of claim 1, wherein associating the user information designation to the at least one data class comprises:

converting the consent into a numerical representation and converting the user information designation into a numerical representation.

5. The computer-implemented method of claim 1, further comprising:

determining a data class to which the user information designation belongs based on the feature vector.

6. The computer-implemented method of claim 5, wherein the numerical representation of the user information designation is represented in a term frequency-inverse document frequency (TF-IDF) form.

7. The computer-implemented method of claim 5, wherein associating the user information designation to the at least one data class comprises:

determining a designation profile for the user information designation;

converting the designation profile into a numerical representation; and adding the numerical representation for the designation profile to the feature vector.

8. The computer-implemented method of claim 7, wherein the designation profile comprises data type information, length information, and null quantity information.

9. The computer-implemented method of claim 5, further comprising, during a training phase, forming a mapping between the user information designation and the at least one data class.

10. The computer-implemented method of claim 9, wherein:

forming a mapping between the user information designation and the at least one data class comprises:

forming a number of training vectors for training information designations which are associated with predetermined data classes; and calculating association variables based on the training vectors and the predetermined data classes.

11. The computer-implemented method of claim 10, wherein associating the user information designation with the at least one data classes comprises applying the association variables to the feature vector.

12. A system comprising:

a database comprising user information for a number of users, wherein the user information is grouped by user information designations;

an interface to receive an indication, per functional area, of user consent which indicates for which functional areas user information for the user is permitted to be shared; and a management controller comprising:

a processor; and a class database comprising:

a number of data classes; and class rules indicating which data classes are permitted to be shared based on consent received; and an associator comprising a processor to associate user information designations with the number of data classes in the management controller; wherein the associator receives as input, a feature vector which includes numerical representations of the user consent indications and a user information designation.

13. The system of claim 12, wherein the associator converts the feature vector into values that map to data classes.

14. The system of claim 12, wherein:

the management controller further comprises a mapping between data classes and functional areas; and at least one data class pertains to multiple functional areas.

15. The system of claim 12, wherein:

the associator is a neural network associator to form a mapping between user information designations and data classes by:

forming training vectors for training information designations which are associated with predetermined data classes; and calculating association variables based on the training vectors and predetermined data classes; and the associator associates user information designations with data classes by applying the association variables the feature vector.

16. The system of claim 12, wherein the user information designations in the database are unique to the system.

17. A computer program product, the computer program product comprising a non-transitory computer readable storage medium having program instructions embodied therewith, the program instructions executable by a processor to cause the processor to:

form, during a training phase, a mapping between user information designations and data classes by:

forming training vectors for training information designations which are associated with predetermined data classes; and calculating association variables based on the training vectors and the predetermined data classes;

determine, based on consent received, data classes that are permitted to be shared;

extract a user information designation stored in a database;

determine a designation profile for the user information designation;

convert the consent into a numerical representation;

convert the user information designation into a numerical representation;

convert the designation profile into a numerical representation;

form a feature vector from the numerical representations of the consent, user information designation, and designation profile;

associate the user information designation in an entity database with a data class in a class database based on the feature vector and association variables; and apply, to user information associated with the user information designation, class rules based on the association between the user information designation and the associated data class.

18. The computer program product of claim 17, further comprising program instructions executable by a processor to cause the processor to, when the user information designation is not similar to any data class, generate a new data class.

19. The computer program product of claim 18, wherein generating a new data class is based on user input.

20. The computer program product of claim 18, wherein generating a new data class further comprises setting class rules for the new data class.

* * * * *